(12) United States Patent
Kräuchi et al.

(10) Patent No.: US 8,973,485 B2
(45) Date of Patent: Mar. 10, 2015

(54) MODULAR MANUFACTURING OF BEVERAGE PRODUCTION MACHINES

(75) Inventors: Frank Kräuchi, Epautheyres (CH); Matthieu Ozanne, Chessel (CH); Stefan Kaeser, Aarau (CH); Rudolf Schenk, Konolfingen (CH); Guido Piai, München (DE); Bernhard Kreitmayr, Pfaffenhofen (DE); Dimitar Georgiev, München (DE)

(73) Assignee: Nestec S.A., Vevey (CH)

( * ) Notice: Subject to any disclaimer, the term of this patent is extended or adjusted under 35 U.S.C. 154(b) by 691 days.

(21) Appl. No.: 12/747,684

(22) PCT Filed: Dec. 9, 2008

(86) PCT No.: PCT/EP2008/067072
§ 371 (c)(1),
(2), (4) Date: Jun. 11, 2010

(87) PCT Pub. No.: WO2009/074550
PCT Pub. Date: Jun. 18, 2009

(65) Prior Publication Data
US 2010/0263543 A1   Oct. 21, 2010

(30) Foreign Application Priority Data
Dec. 12, 2007   (EP) .................................... 07123009

(51) Int. Cl.
*A47J 31/057* (2006.01)
*A47J 31/44* (2006.01)

(52) U.S. Cl.
CPC .......... *A47J 31/4403* (2013.01); *A47J 31/4421* (2013.01); *A47J 31/4485* (2013.01); *A47J 2201/00* (2013.01)
USPC .......................................................... 99/279

(58) Field of Classification Search
USPC .......... 99/275, 279, 280, 284, 290–293, 295, 99/303, 323.1
See application file for complete search history.

(56) References Cited

U.S. PATENT DOCUMENTS 2,927,333 A   3/1960   Luehrs
2,927,533 A   3/1960   Luehrs
(Continued)

FOREIGN PATENT DOCUMENTS

AT   410377   4/2003
CH   682 798   11/1993
(Continued)

OTHER PUBLICATIONS

Page 66 of the official Diary of Chile listing CL 3721-08 (corresponding to US 2010/0263543A1) dated Jan. 8, 2010.
(Continued)

*Primary Examiner* — Brian Jennison
(74) *Attorney, Agent, or Firm* — Winston & Strawn LLP

(57) ABSTRACT

A modular method of manufacturing a set of beverage production machines with different beverage-related functions. The machines are designed for producing a beverage on the basis of pre-portioned ingredient packages. The method includes providing a plurality of identical core units having control circuitry and a beverage production module for housing an ingredient package and feeding a liquid to the interior of the ingredient package, providing a plurality of different base platforms that differ as to beverage production functions, and manufacturing a set of different beverage production machines by mounting respectively at least one of the core units on a top surface of one of the differing base platforms while also mounting water reservoirs on the base platforms.

25 Claims, 8 Drawing Sheets

(56) References Cited

U.S. PATENT DOCUMENTS

| | | | |
|---|---|---|---|
| 3,218,955 A | 11/1965 | Lorang | 99/282 |
| 3,938,492 A | 2/1976 | Mercer, Jr. | |
| 4,054,085 A | 10/1977 | Tarr | |
| 4,164,306 A | 8/1979 | Perrin | |
| 4,253,385 A | 3/1981 | Illy | 99/281 |
| 4,377,049 A | 3/1983 | Simon et al. | 40/465 |
| 4,389,925 A | 6/1983 | Piana | |
| 4,458,735 A | 7/1984 | Houman | 141/95 |
| 4,554,419 A | 11/1985 | King et al. | 200/5 |
| 4,681,495 A | 7/1987 | Crespin et al. | 411/298 |
| 4,757,753 A * | 7/1988 | Pandolfi | 99/290 |
| 4,767,632 A | 8/1988 | Meier | 426/231 |
| 4,829,888 A | 5/1989 | Webster et al. | |
| 4,892,031 A | 1/1990 | Webster et al. | |
| 4,954,697 A | 9/1990 | Kokubun et al. | 235/381 |
| 5,036,998 A | 8/1991 | Dunn | |
| 5,161,455 A | 11/1992 | Anson et al. | 99/280 |
| 5,193,701 A | 3/1993 | Bush et al. | |
| 5,312,020 A | 5/1994 | Frei | 222/129.1 |
| 5,335,705 A | 8/1994 | Morishita et al. | 141/275 |
| 5,353,692 A | 10/1994 | Reese et al. | 99/289 |
| 5,372,061 A | 12/1994 | Albert et al. | 99/281 |
| 5,375,508 A | 12/1994 | Knepler et al. | 99/280 |
| 5,498,757 A | 3/1996 | Johnson et al. | |
| 5,645,230 A | 7/1997 | Marogna et al. | 241/27 |
| 5,731,981 A | 3/1998 | Simard | 364/465 |
| 5,836,236 A | 11/1998 | Rolfes et al. | 99/290 |
| 5,855,161 A | 1/1999 | Cortese | |
| 5,890,615 A | 4/1999 | Petras | |
| 5,916,351 A | 6/1999 | Sintchak | |
| 5,927,553 A | 7/1999 | Ford | 222/129.4 |
| 5,959,869 A | 9/1999 | Miller et al. | 364/479.01 |
| 5,992,298 A | 11/1999 | Illy et al. | |
| 6,029,562 A * | 2/2000 | Sintchak | 99/275 |
| 6,062,127 A | 5/2000 | Klosinski et al. | 99/303 |
| 6,123,010 A | 9/2000 | Blackstone | 99/284 |
| 6,182,555 B1 | 2/2001 | Scheer et al. | 99/290 |
| 6,213,336 B1 | 4/2001 | Lin | |
| 6,325,312 B1 | 12/2001 | Karkos, Jr. | |
| 6,345,570 B1 | 2/2002 | Santi | |
| 6,354,341 B1 | 3/2002 | Saveliev et al. | 141/94 |
| 6,582,002 B2 | 6/2003 | Hogan et al. | |
| 6,759,072 B1 | 7/2004 | Gutwein et al. | 426/433 |
| 7,028,603 B1 | 4/2006 | Gremillion et al. | 99/290 |
| 7,093,533 B2 | 8/2006 | Tebo, Jr. et al. | |
| 7,210,401 B1 | 5/2007 | Rolfes et al. | 99/289 |
| 7,270,050 B2 | 9/2007 | Glucksman et al. | 99/297 |
| 7,279,660 B2 | 10/2007 | Long et al. | 219/441 |
| 7,350,455 B2 | 4/2008 | Vetterli | 99/280 |
| 8,695,484 B2 | 4/2014 | Mori | |
| 8,800,433 B2 | 8/2014 | Cahen et al. | |
| 2002/0185016 A1 | 12/2002 | Hoffhann et al. | |
| 2003/0070555 A1 | 4/2003 | Reyhanloo | 99/282 |
| 2004/0015263 A1 | 1/2004 | Chadwell et al. | 700/216 |
| 2005/0015263 A1 | 1/2005 | Beal et al. | 705/1 |
| 2005/0258186 A1* | 11/2005 | Hart et al. | 222/1 |
| 2007/0056994 A1 | 3/2007 | Woodnorth et al. | |
| 2007/0062378 A1 | 3/2007 | Glucksman et al. | |
| 2007/0157820 A1 | 7/2007 | Bunn | 99/275 |
| 2007/0175338 A1 | 8/2007 | Glucksman et al. | |
| 2009/0101021 A1 | 4/2009 | Tonelli et al. | 99/290 |
| 2009/0173235 A1 | 7/2009 | Kollep et al. | 99/279 |
| 2010/0251900 A1 | 10/2010 | Cahen et al. | 99/323.1 |
| 2010/0263547 A1 | 10/2010 | Cahen et al. | 99/300 |
| 2010/0263550 A1 | 10/2010 | Cahen et al. | 99/323.1 |
| 2010/0300301 A1 | 12/2010 | Cahen et al. | 99/323.1 |
| 2011/0041698 A1 | 2/2011 | Mori | 99/290 |

FOREIGN PATENT DOCUMENTS

| | | |
|---|---|---|
| CN | 2235252 Y | 9/1996 |
| CN | 1209041 A | 2/1999 |
| CN | 2387836 | 7/2000 |
| CN | 2682954 Y | 3/2005 |
| CN | 1875831 | 12/2006 |
| DE | 44 29 353 | 2/1996 |
| DE | 20 2006 002 124 | 5/2006 |
| DE | 20 2006 019 039 | 4/2007 |
| DE | 102006060748 | 1/2008 |
| EP | 0 549 887 | 7/1993 |
| EP | 0 838 186 | 4/1998 |
| EP | 08155753.0 | 7/2003 |
| EP | 1 440 639 | 7/2004 |
| EP | 1 448 084 | 8/2004 |
| EP | 1 676 509 | 7/2006 |
| EP | 1 707 088 | 10/2006 |
| EP | 1 731 065 | 12/2006 |
| EP | 1772081 A1 | 4/2007 |
| EP | 1 798 457 | 6/2007 |
| EP | 1 859 713 | 11/2007 |
| EP | 08155851.2 | 11/2007 |
| EP | 1 864 598 | 12/2007 |
| EP | 1 867 260 | 12/2007 |
| EP | 1 878 368 | 1/2008 |
| EP | 2 070 454 | 6/2009 |
| FR | 2 440 720 | 11/1979 |
| FR | 2 544 185 A3 | 10/1984 |
| FR | 2 554 185 | 5/1985 |
| FR | 2 624 844 | 6/1989 |
| FR | 2648695 A1 | 12/1990 |
| GB | 2 397 510 | 7/2004 |
| GB | 2 421 423 | 6/2006 |
| JP | 50054990 A | 5/1975 |
| JP | 51135081 U | 11/1976 |
| JP | 52138542 U | 10/1977 |
| JP | 54065788 U | 5/1979 |
| JP | 55-128626 U1 | 9/1980 |
| JP | S59174120 A | 10/1984 |
| JP | 61119218 A | 6/1986 |
| JP | 62-100138 U | 6/1987 |
| JP | H0638880 A2 | 2/1994 |
| JP | 11253330 A2 | 9/1999 |
| JP | 2001222761 A | 8/2001 |
| JP | 2002191505 A | 7/2002 |
| JP | 2004527893 A | 9/2004 |
| JP | 2006341097 A | 12/2006 |
| LU | 85318 | 9/1984 |
| RU | 1797482 A3 | 2/1993 |
| RU | 2294875 C2 | 3/2007 |
| WO | WO97/24052 | 7/1997 |
| WO | WO 97/25634 | 7/1997 |
| WO | WO 99/50172 | 10/1999 |
| WO | WO01/52704 A1 | 7/2001 |
| WO | WO 02/059534 | 8/2002 |
| WO | WO02/070371 A2 | 9/2002 |
| WO | WO 02/097927 | 12/2002 |
| WO | WO02097927 A1 | 12/2002 |
| WO | WO 03039309 | 5/2003 |
| WO | WO 03/075629 | 9/2003 |
| WO | WO 03/093142 A1 | 11/2003 |
| WO | WO 2004/030435 | 4/2004 |
| WO | WO 2004/030438 | 4/2004 |
| WO | WO 2005/099535 | 10/2005 |
| WO | WO 2006/050900 | 5/2006 |
| WO | WO 2006/063645 | 6/2006 |
| WO | WO 2006/082064 | 8/2006 |
| WO | WO 2006/090183 | 8/2006 |
| WO | WO 2006/122916 | 11/2006 |
| WO | WO 2007/003062 | 1/2007 |
| WO | WO 2007/003990 | 1/2007 |
| WO | WO 2007/141334 | 12/2007 |
| WO | WO 2008/046837 | 4/2008 |
| WO | WO 2008/104751 | 9/2008 |
| WO | WO 2008/138710 | 11/2008 |
| WO | WO 2008/138820 | 11/2008 |
| WO | WO 2011/092644 | 8/2011 |

OTHER PUBLICATIONS

Chilean Search Report for CL 3720-08 dated Feb. 7, 2011 (corresponding to US 2010-0263547A1).
CL-2023-07 cited in Chilean Search Report, CL 3720-08 dated Feb. 7, 2011 (corresponding to US 2009-0173235A1).

(56) References Cited

OTHER PUBLICATIONS

European Search Report, Application No. EP 10167803 mailed Aug. 27, 2010.
International Search Report, PCT/EP2008/067072, mailed Oct. 9, 2009.
International Search Report, PCT/EP2008/067075, mailed Aug. 27, 2009.
International Search Report, PCT/EP2008/067077, mailed Oct. 14, 2009.
International Search Report, PCT/EP2008/067079, mailed Apr. 9, 2009.
International Search Report, PCT/EP2008/067083, mailed Apr. 16, 2009.
U.S. Appl. No. 12/747,841, Non-Final Office Action, dated Dec. 18, 2012.
U.S. Appl. No. 12/988,295, Restriction Requirement, dated Aug. 16, 2012.
U.S. Appl. No. 12/747,820, Restriction Requirement, dated Feb. 15, 2013.
U.S. Appl. No. 12/747,794, Non-Final Office Action, dated Jan. 30, 2013.
U.S. Appl. No. 12/747,743, Non-Final Office Action, dated Apr. 11, 2013.
U.S. Appl. No. 12/988,295, Non-Final Office Action, dated May 6, 2013.
U.S. Appl. No. 12/747,794, Final Office Action, dated Jun. 6, 2013.
U.S. Appl. No. 12/747,820 Final Office Action dated Dec. 4, 2013.
U.S. Appl. No. 12/747,820 Advisory Action dated Feb. 12, 2014.
U.S. Appl. No. 12/747,743 Notice of Allowance and Fees Due (PTOL-85) dated Apr. 2, 2014.
P007910120—Kaffeevollautomatern Magnifica II—ESAM 300 B—Mar. 12, 2007.
U.S. Appl. No. 12/747,743 Non-Final Office Action dated Sep. 25, 2013.
U.S. Appl. No. 12/988,295 Final Office Action dated Jul. 24, 2013.
U.S. Appl. No. 12/747,841, Advisory Action, dated Jul. 26, 2013.
U.S. Appl. No. 12/747,820 Non-Final Office Action dated Aug. 2, 2013.
U.S. Appl. No. 12/747,841, Final Office Action, dated May 13, 2013.
U.S. Appl. No. 12/988,295, Notice of Allowance dated Dec. 2, 2013.
U.S. Appl. No. 12/747,820, Final Office Action dated Dec. 4, 2013.
Japanese Office Action, Application No. P2013-170594, dated Jun. 24, 2014 with English translation for relevant portion(s) of JP references JP62100138 and JP55128626.
U.S. Appl. No. 12/747,794 Non-Final Office Action, Jul. 29, 2014.
U.S. Appl. No. 12/747,841 Non-Final Office Action, Jul. 22, 2014.

\* cited by examiner

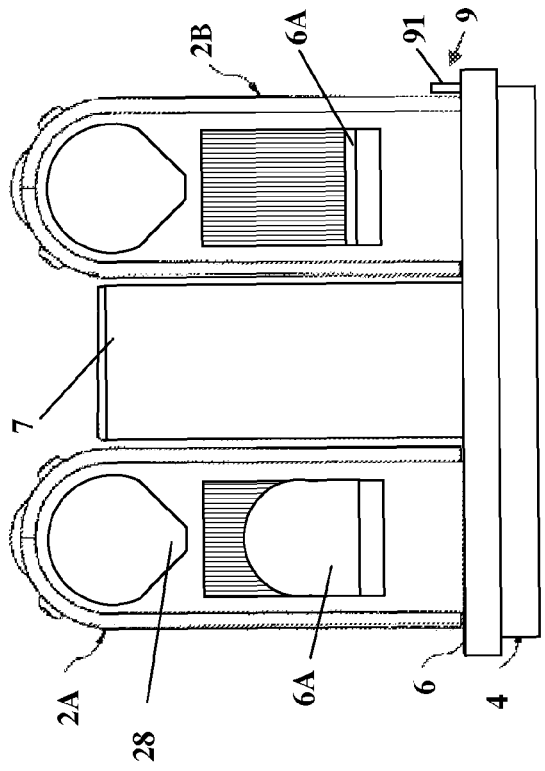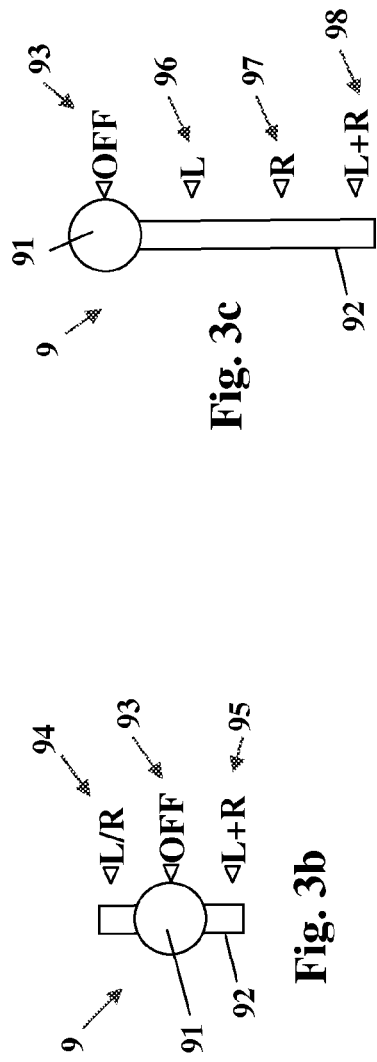

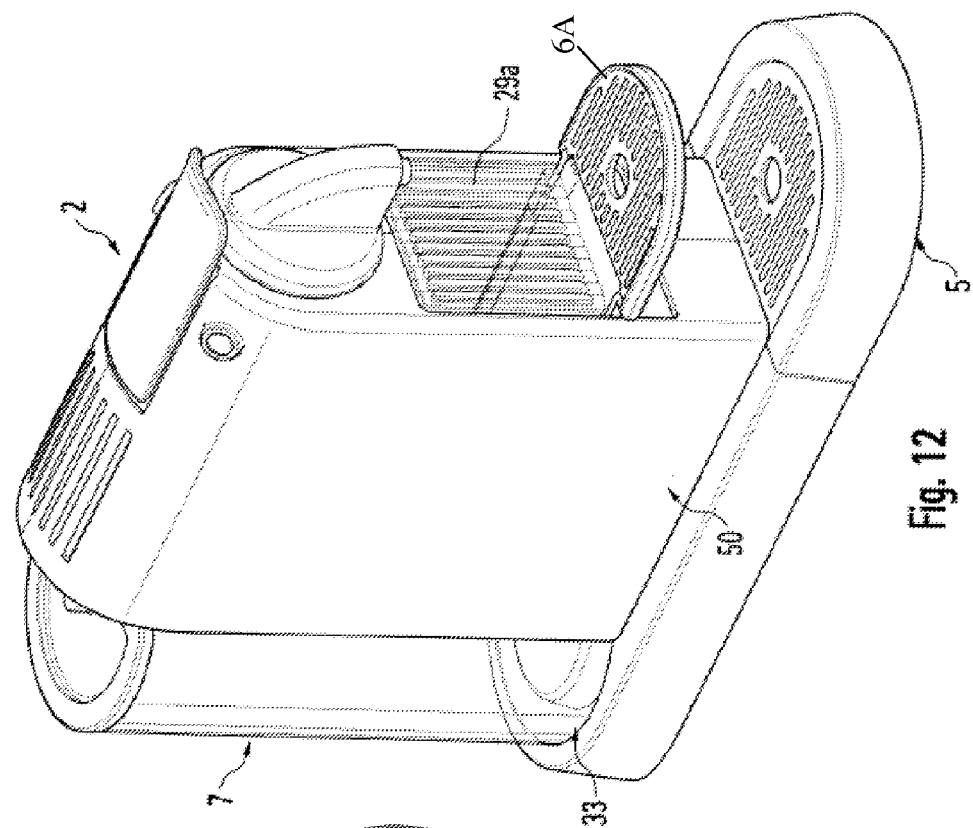
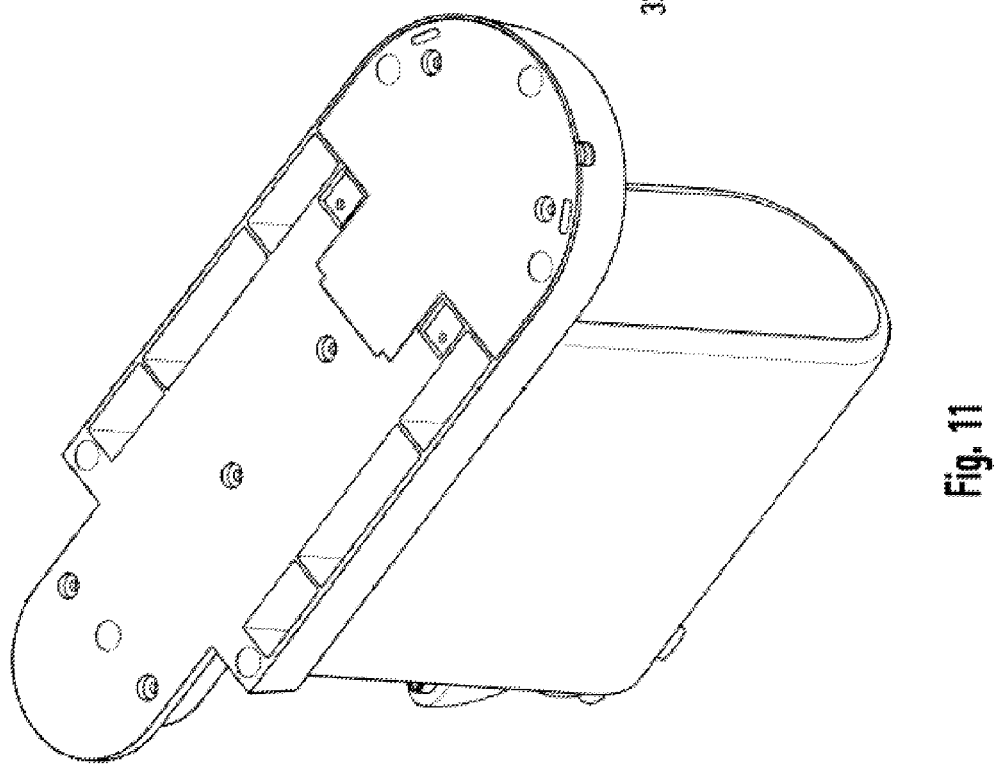

MODULAR MANUFACTURING OF BEVERAGE PRODUCTION MACHINES

This application is a 371 filing of International Patent Application PCT/EP2008/067072 filed Dec. 9, 2008.

FIELD OF THE INVENTION

The invention relates to the field of manufacturing beverage production machines, particularly machines which are designed to produce a beverage using a pre-portioned beverage or liquid comestible (soup etc.) ingredient such as e.g. capsules or pods containing ground roasted coffee.

For the purpose of the present description, a "beverage" is meant to include any liquid food, such as tea, coffee, hot or cold chocolate, milk, soup, baby food, etc. . . . .

BACKGROUND ART

The development and manufacturing of a range of beverage producing machines, in particular those using portioned ingredients such as capsules or pods, offering different functions and/or different beverage delivery capacities, is complex and costly.

There is a need for rationalizing the development and the manufacturing of the beverage machines while still providing a large range of machines with different functions and options for the consumer.

In particular, it would be an advantage to propose a range of highly versatile beverage producing machines using capsules or pods which can be upgraded, i.e. provided with additional beverage-related functions, at low production costs.

FR 2 554 185 teaches a series of modular elements which can be combined together so as to constitute an espresso coffee beverage system. The modular elements are associated side by side. One element is a coffee producing module. Another element is a steam producing module. Each element comprises an electrical connection.

WO 2007/141334 discloses a modular beverage production system with a docking station and a beverage production module having inter-connected control circuitries. The control circuitry of the module can be disconnected from the circuitry of the docking station for an autonomous control of the module when the module is disconnected from the station.

US 2005/0015263 discloses a network of various food services equipment items that can be controlled from a central computer.

OBJECT OF THE INVENTION

It is an object of the invention to rationalize the production of beverage production machines by offering a range of differing beverage production machines.

"Differing beverage production machines" relates to the beverage-relevant functions of the machines, i.e. different beverage production machines differ as to their hardware or software as how they are able to physically or chemically alter characteristics of the beverage. As the beverage is made based on ingredients and one or more liquids, the beverage-related functions relate to any kind of handling a liquid (water, milk, . . . ) or an ingredient. The "handling" relates to the chemical, physical and/or mechanical processing of the liquid(s) or ingredient.

Non-limiting examples for the physical processing are: heating, changing the texture (e.g. frothing), and mixing. An example for the mechanical processing is dosing. A non-limiting example for the chemical processing is: changing the ingredient/liquid interaction.

This object is achieved by means of the features of the independent claims. The dependent claims develop further the central idea of the invention.

SUMMARY OF THE INVENTION

A first aspect of the invention relates to a method of manufacturing a set of beverage production machines with different beverage-related functions. The beverage production machines are designed for producing a beverage on the basis of pre-portioned ingredient batches, in particular contained in packages. The method comprises the steps of:

providing a plurality of identical core units, the core units being provided with control circuitry and a beverage production module designed for housing an ingredient batch and feeding a liquid to the interior of the ingredient batch, providing a plurality of different base platforms, the base platforms differing as to beverage production functions, and manufacturing a set of different beverage production machines by mounting the core units on the top surface of the differing base platforms and by mounting in particular water reservoirs on the base platforms.

The pre-proportioned ingredient batches may be supplied within packages, typically capsules, to the production machine or may be formed in the machine by supplying a pre-determined amount of ingredient from an ingredient reservoir of the machine. Optionally, the ingredient supplied from the reservoir may be transformed before liquid is fed thereto. For example, the ingredient is ground coffee that is supplied to the production machine within packages or from a reservoir of the machine containing a stock of ground coffee. Alternatively, the ingredient is in the form of coffee beans stored in a reservoir that are supplied in batches and ground before the liquid is fed.

Each base platform may be provided with a seat for receiving a core unit and a connection for receiving a water tank and the electrical supply means. Thus, when mounting a core unit on a base platform, in one step, an electrical connection and a fluid connection between core unit and the base platform may be produced.

Another aspect of the invention relates to a set of differing beverage production machines, manufactured by such a method.

According to a still further aspect of the invention, a set of differing beverage production machines is proposed. Each beverage production machine of the set comprises:

a core unit that is provided with control circuitry and a beverage production module that is arranged for housing an ingredient batch and feeding a liquid to the interior of the ingredient batch, the at least one core unit being mounted on one out of a plurality of different base platforms, the base platforms differing as to beverage production functions.

Each base platform may be provided with a seat for receiving a core unit and a connection for receiving a water tank and the electrical supply means.

The base platforms may be provided with water guiding means for supplying water from the water tank to a connected core unit.

The beverage production module can be designed for ingredient batches provided in capsules or pods.

At least one base platform may be designed to accommodate at least two core units and to supply them with water, preferably from a common water tank. The control circuitries of such core units are preferably inter-connected as discussed in below in greater details.

A still further aspect of the invention relates to a beverage production machine. The machine comprises:

one or more units provided with control circuitry and a beverage production module designed for housing a sealed capsule or a pod and for feeding a liquid to the interior of the ingredient batch, the at least one core unit being mounted on a base platform providing the core unit with electrical power and water from a water tank also mounted to the base platform.

The capsule or pod contains one or more ingredients for producing a beverage or liquid comestible (soup etc,) when interacting with a supplied liquid (water etc.). The interaction can be e.g. mixing, extracting, brewing or diluting.

Yet another aspect of the invention relates to a beverage production machine comprising a plurality of core units, each unit being provided with a beverage production module designed for housing a beverage ingredient batch, in particular an ingredient contained in a package such as a capsule or a pod, and for feeding a liquid to the beverage ingredient batch, wherein at least two of the core units have a common user power switch (or main switch), such as a toggle-switch or rotatable wheel or knob switch.

In one embodiment, the power switch has only two selection positions for switching on and off said at least two of the core units, in particular the entire plurality of core units, simultaneously.

In another embodiment, the machine has a total number of core units and the power switch has one or more selection positions for switching on a number of core units that is smaller than this total number, the remaining core unit(s) remaining switched off.

For instance, the selection position(s) for switching on a number of core units that is smaller than the total number of core units, is/are permanently associated with one or more corresponding core units.

The machine may comprise a control unit, the selection position(s) for switching on a number of core units that is smaller than the total number, designate(s) a number of core units to be switched on simultaneously, the control unit being arranged to select which core unit(s) to switch on based on an individual history of use of the core units. This latter embodiment is particularly advantageous to avoid uneven wear of the core units. Typically, the history that may be taken into account can include the total number of hours of past activity of each core unit and/or the total number of beverage preparation cycles that have been carried out by each core unit.

To simplify the electronic conception and reduce the number of components, such a control unit may incorporate the control circuitry of one or more core units.

A further aspect of the invention relates to a beverage production machine, in particular a machine as described above. This machine comprises a plurality of core units, each unit being provided with a control circuitry and a beverage production module designed for housing a beverage ingredient batch, in particular an ingredient contained in a package such as a capsule, and for feeding a liquid to the beverage ingredient batch. At least two of the core units have their control circuitries connected together via communication means for exchanging data whenever needed.

The presence of communication means between different core units that are part of the same beverage production machine permits the coordination of the operation of these core units. This is of particular importance when the core units share common resources during use, e.g. a froth milk device, material and/or power sources. Communication between the core units can lead to an optimal sharing of the resources and smooth use of the production machine. Such resources may include fluid resources, electrical power resources, ingredient resources, user interface resources, etc.

The communication means are advantageously arranged to allow a bidirectional communication between two inter-connected control circuitries.

Various communication interfaces and connections can be used to inter-connect the control circuitries, such as SPI, I$^2$C, USART, USB systems, wire-bound or even wireless systems. However, it has been found that the communication means between two inter-connected control circuitries can advantageously be made of a simple level shifter, which is inexpensive and allows fast communication and can easily be fitted on the existing type of control circuitry for machines with a single core unit.

Advantageously, the communication means between a pair of inter-connected control circuitries comprise: two transmission cables and a neutral cable extending between a pair of inter-connected control circuitries; and a pair of transistors. A less preferred communication means can involve the use of optocouplers. However, these are slower, more expensive and more energy consuming than a transistor-based configuration.

Usually, one of the connected control circuitry has a master status, the remaining inter-connected control circuitry(ies) having a slave status. Such a slave/master configuration of the control circuitries is particularly advantageous to avoid the need of an additional central control unit for controlling and coordinating the control circuitries of the different core units.

Each inter-connected control circuitry can be arranged to periodically communicate its current master or slave status to the remaining control circuitry(ies) using a master/slave signal. Hence, when for some reason, a control circuitry does not send any master/slave signal, for instance when one core unit becomes inactive, e.g. when it is individually switched off or has a failure, the remaining control circuitries can adapt the operation of their respective core unit to the new configuration. A master/slave signal can be sent from an inter-connected control circuitry every few milliseconds, typically at regular intervals that are in the range of 1 to 20 ms, in particular at about 8.33 or 10 ms.

Preferably, each inter-connected control circuitry is so configured to change its status from slave to master and vice versa, whenever needed. This is particularly useful in case a core unit that is in a master status becomes inactive, and whose master function needs to be replaced by another core unit that acquires a master status.

Typically, each inter-connected control circuitry is configured to be in a slave status as a default status. A master determination process is used to change the status of one of the inter-connected control circuitry to a master status when none of the inter-connected control circuitry has a master status.

In practise, when all the inter-connected control circuitries find themselves in a slave status, for instance at start-up or when the master control circuitry has been deactivated, the slaves will wait for a given period of time, e.g. a few tens of milliseconds such as to 250 ms in particular 100 to 200 ms, before initiating a master designation process. A master designation process can involve a random function, for instance a time-based function that runs simultaneously on all slaves and is terminated when the first slave, after a random period of time determined by this function, is assigned the task to carry out the master function and announces itself as new master vis-à-vis the remaining slaves that then remain slaves in the system.

Conversely, a core unit that has a slave status and that is used more intensively than the core unit with the master status, may take over the master status, the former master becoming a slave. This is particularly advantageous when a master status, compared to slave status, is associated with a prioritised access to shared resources while the slaves only have a subsidiary access.

The inter-connected control circuitries can be arranged to communicate between themselves using a synchronisation signal for allocating between the core units one or more shared resources, such as supply sources of material and/or power having a limited availability and/or limited accessibility, so as to provide a synchronised and enhanced allocation of the supply source(s) between the core units over time.

As mentioned above, a control circuitry having a master status can be arranged to allocate the limited supply sources of material and/or power or other resources as needed for its core unit. In such as case, the control circuitry(ies) having a slave status are arranged to allocate to their respective core unit, the residual allocation capacity of the limited supply sources, within the limits of their own needs of material and/or power or other resources.

When the control circuitries of the core units are arranged to send master/slave signals to each other, such signals are optionally superimposed with the synchronisation signal on a same communication channel but separated through time windows.

In one embodiment, each core unit comprises a thermo-block for heating the liquid prior to feeding to an ingredient batch. In such a case, the inter-connected control circuitries can be arranged to synchronise access by the core units of a common power source with overall limited accessibility per time unit and/or a limited availability, to optimise heating in the thermo-blocks within such overall access and/or power limit. Furthermore, to optimise the operation of the thermo-blocks and their heating and therefore the required allocation of electrical power, the temperature of each thermo-block and/or of the liquid heated thereby is preferably monitored by at least one temperature sensor, optionally combined with a flow meter, connected to the control circuitry of the corresponding core unit.

Typically, the beverage production machine will be connected to an electric network with limited power supply. Such limit may be comprised within a range of 10 to 16 A in a European 220 V network. When the power consumption exceeds this limit the network is disconnected from the central power supply, for example by means of a fuse. Typically, the energy consumption of a core unit with a thermo-block is of the order of 1 to 1.5 kW. Operating several core units simultaneously can thus quickly reach the network's power limit and lead to disconnection. To avoid such a disconnection, the inter-connected control circuitries are so configured that the power used at a given time by the beverage production machine does not reach the network limit, if necessary for example by prioritising the access by the different core units to the power supply over time.

Another problem arises from the perturbation caused in the electric network by any access thereto. Only a limited amount of perturbations, voltage changes, caused by the connection or disconnection of electric appliances to the network, are tolerated. Such norms are called the flicker standards (e.g. EN 61000-3-3) whose limits should not be exceeded by such appliances.

In the context of the beverage production machine of the invention, the temperature of the fluid that is then fed to the ingredient batch should be adjusted to ensure the quality of the final beverage. For instance, for a coffee extraction, the temperature of the fluid, i.e. water, should be maintained within a narrow range, usually from 80 to 90° C., preferably around 86° C.±3° C. When thermo-blocks use a two-state resistor type heater, i.e. an "on or off" type heater with no intermediate level, the temperature adjustment of the heater can only be achieved by adjusting the respective lengths of successive connections and disconnections of the heater to the electric power supply. However, each connection or disconnection induces a perturbation of the network relevant for the flicker standard. It is therefore up to the different inter-connected control circuitries to adapt the connections and disconnections of the thermo-blocks in such a manner that the flicker limits are not exceeded. In particular, to reduce the number of connections/disconnections, the inter-connected control circuitries can be arranged, not only to limit to control the frequency of connections/disconnections of the different thermo-blocks but also to arrange the disconnection of one thermo-block simultaneously with the connection of another thermo-block, i.e. to switch the power supply from one thermo-block to another so that the overall power intake of the beverage production machine remains at a constant level, despite the machine's internal connections/disconnections, and does thus not cause any disturbances in the external electric network to which the beverage production machine is connected.

Therefore, the inter-connected control circuitry of each core unit can be arranged to send a synchronisation signal to the other inter-connected control circuitries for each individual access to the power source with limited accessibility per time unit, so that the overall access limit of the power source per time unit is not exceeded by the total accesses by the different core units during the corresponding time unit. In particular, the inter-connected control circuitries may be so arranged that all the core units enter a pause mode when the overall access limit during a time unit is reached or close to be reached, no liquid heated by the thermo-blocks being fed to an ingredient batch during the pause mode until the corresponding time unit has ended and a new a time unit has started.

For instance, the inter-connected control circuitries are so arranged to count during a time unit all accesses to the power source for heating batches of the liquid passed through the thermo-blocks and then fed to the ingredient batch, and arranged to enter a pause mode when during said time unit the heating by a thermo-block of a further batch of liquid would necessitate a number of accesses to the power source that would lead to exceeding the overall access limit.

It follows that the greater the control of the temperature of the fluid passing through the thermo-block, the greater is the number of accesses (connections and disconnections) of the thermo-block to follow closely a desired temperature profile. It may therefore be necessary, when a close control of the temperature is desired, to reduce the number of heated batches of fluid that are passed through the ingredient batches. In other words, the higher the temperature-related quality of the beverages, the lower the frequency at which the beverages may be produced with the beverage production machine.

For example, in the case of a beverage production machine having two core units for extracting coffee batches, in particular in the form of packages, such as capsule, it will be possible to configure the control circuitry so as to have a pause period/extraction time ratio in the range of 0.25 to 0.5. In other words, in a time period of 10 min., it will be possible to extract coffee (and heat water in the thermo-blocks) between 3 to 8 min which correspond to 3 to 8 cups of coffee, and allow the machine to pause during 2 to 7 min. Typically, or 6 high quality coffee can be extracted during a period of time of 10 min. and leave the machine inactive for about 4 min. during this 10 min. period of time.

Should the user have exhausted the maximum number of beverages that can be prepared during a specific period of time, a cycle, he will have to wait, during a pause period, until a new cycle has begun.

In comparison, in the case of a beverage production machine with two core units that are configured to extract a coffee at 86° C. with a deviation of no more than 3° C. and that are not coordinated as described above, i.e. which can be operated independently and freely from one another, without any consideration for connections and disconnections of the thermo-blocks, the flicker limit may be exceeded by about 50%. If the core units are coordinated but no pause mechanism is provided, the flicker limit may still be exceeded by about 10%.

Further details, objects and advantages of the invention will become evident for the skilled person when reading the following detailed explanations of embodiments of the invention when taken in conjunction with the Figures of the enclosed drawings.

BRIEF DESCRIPTION OF THE DRAWINGS

The invention will now be described with reference to the schematic drawings, wherein:

FIG. 3a shows a front view of the system shown in FIG. 3, FIGS. 3b and 3c showing an enlarged top view of two power toggle-switch suitable for such a system.

FIG. 11 shows the screwing of the base platform to the core unit to achieve a final secured connection.

FIG. 12 shows a core unit mounted on a first base platform.

DETAILED DESCRIPTION

Figure 1:
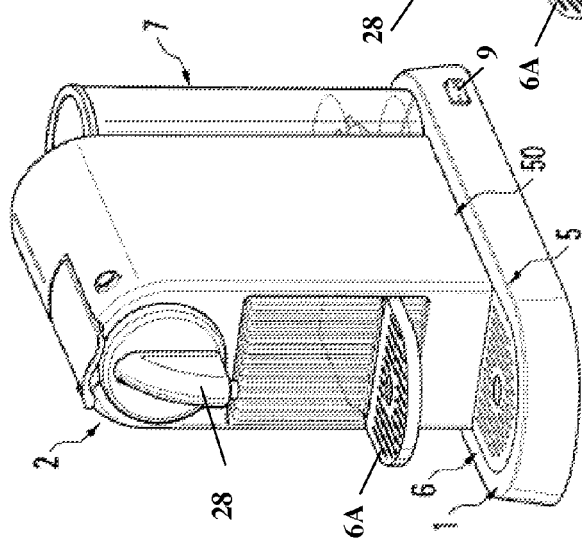

In FIG. 1, one example for a configuration comprising a core unit 2 and a base platform 1 is illustrated. The base platform has the minimal functions as to the fluid management, which is supplying the core unit 2 with electrical power and with water from a water tank 7 attached to the base platform. To this regard the base platform 1 according to this example is provided with integrated electrical circuitry to be connected to the mains. Additionally, the shown base platform is provided with water feed lines connecting the water tank 7 with a fluid connector arranged at the top surface of the base platform 1, on which top surface the core unit 2 is fixedly mounted.

"Fixedly mounted" indicates that the core unit is mounted on the base platform 1 at the manufacturing site. Thus, the mounting is "fixed" in the sense that a consumer can not easily detach the core unit from the base platform 1. Preferably the core unit 2 is screwed or bolted to the base platform 1.

Alternatively the core unit 2 can be mounted on the base platform 1 such that a user can detach it, e.g. in order to transport it easily or in order to replace the platform (e.g. by a different one having differing functionalities). This releasable mounting can be achieved e.g. via locking means which can be manually released e.g. via a push-button.

In the shown example, the base platform comprises a base support 5 with a seat 50 to receive the core unit assembly 2, a drip tray 6 and a removable water tank assembly 7. Drip tray 6 is covered with a grid member or perforated plate for supporting a receptacle to be filled with beverage via an outlet nozzle in delivery cover 28.

Figure 2:
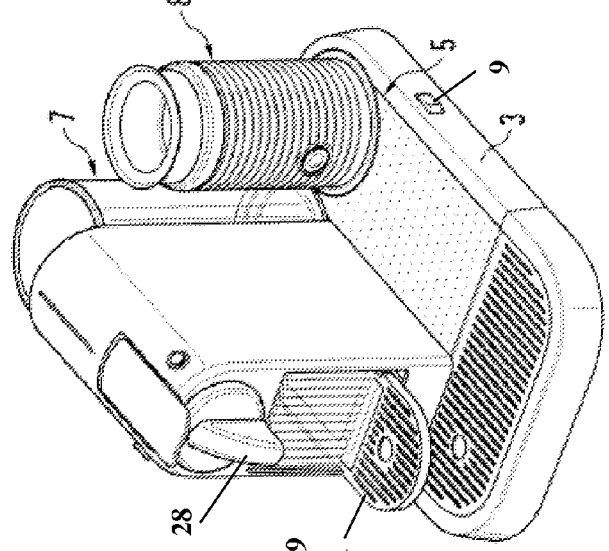

In FIG. 2, a more sophisticated configuration of the system is shown in which the base platform 3 comprises a master switch 9, a base support 5, a drip tray assembly 6, a removable water tank assembly 7 and a milk frothing assembly 8. The milk frothing assembly 8 is one example for a fluid management device able to alter the chemical or physical characteristics of a liquid.

Figure 3:
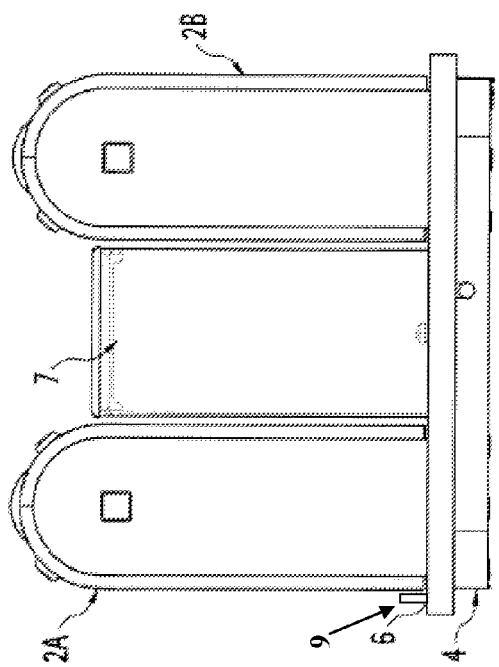
FIGS. 1 to 3 show three different examples of a system of the invention; each example comprising a common core unit 2, 2A, 2B and different base platforms 1, 3, 4 onto which the core unit (or units) is (are) attached.

FIG. 3 is a rear view and FIG. 3a is a front view of another configuration in which two core units 2A, 2B are connected to a single base platform 4 with a master switch 9. One trip tray assembly 6 is provided. Alternatively, two drip trays assemblies may be provided for each of the core units 2A, 2B.

A retractable cup support member 6A is provided above drip tray assembly 6 for supporting small size cups under the beverage outlet in outlet cover 28. Larger cups or mugs can be placed directly on drip tray assembly 6 when support member 6A is in its retracted position. On the left-hand side of FIG. 3a, support member 6A is shown in its retracted or rest position, pivoted upwards against core unit 2A. On the right-hand side of FIG. 3a, support member 6A is shown in its deployed horizontal position for supporting small cups.

Switch 9 of the system illustrated in FIGS. 3 and 3a is shown in greater detail in FIG. 3b. FIG. 3c illustrates a variation of such a switch.

Switches and interfaces and their constructional features are well known in the art, as for instance disclosed in AT 410 377, CH 682 798, DE 44 29 353, DE 20 2006 019 039, EP 1 448 084, EP 1 676 509, EP 1 707 088, EP 08 155 851.2, FR 2 624 844, GB 2 397 510, U.S. Pat. No. 4,253,385, U.S. Pat. No. 4,377,049, U.S. Pat. No. 4,458,735, U.S. Pat. No. 4,554,419, U.S. Pat. No. 4,767,632, U.S. Pat. No. 4,954,697, U.S. Pat. No. 5,312,020, U.S. Pat. No. 5,335,705, U.S. Pat. No. 5,372,061, U.S. Pat. No. 5,375,508, U.S. Pat. No. 5,645,230, U.S. Pat. No. 5,731,981, U.S. Pat. No. 5,836,236, U.S. Pat. No. 5,927,553, U.S. Pat. No. 5,959,869, U.S. Pat. No. 6,182,555, U.S. Pat. No. 6,354,341, U.S. Pat. No. 6,759,072, U.S. Pat. No. 7,028,603, U.S. Pat. No. 7,270,050, U.S. Pat. No. 7,279,660, U.S. Pat. No. 7,350,455, US 2007/0157820, WO 97/25634, WO 99/50172, WO 03/039309, WO 2004/030435, WO 2004/030438, WO 2006/063645, WO 2006/082064, WO 2006/090183, WO 2007/003062, WO 2007/003990, WO 2008/104751, WO 2008/138710 and WO 2008/138820.

Switch 9 is of the toggle-type with a lever 91 movable along a selection path 92 into various selection positions 93 to 98.

Toggle-switch of FIG. 3b has three selection positions and allows a user to:
- switch on left core unit 2A or right core unit 2B, as indicated by position 94 and corresponding visual sign "L/R" for "Left" or "Right",
- switch on left core unit 2A and right core unit 2B simultaneously, as indicated by position 95 and corresponding visual sign "L+R" for "Left" and "Right", or
- switch off both core units 2A,2B, as indicated by position 93 and corresponding visual sign "OFF".

When a user does not need both units to be operational at the same time, for example because he or she only wants one cup of beverage to be prepared, the user will move toggle-switch member 91 into selection position 94. In this position, the system will determine itself which unit 2A or unit 2B should be activated, for instance in view of the history of use of units 2A and 2B so as to allow even wear of the two core units, used separately over time. In this case, the system includes a control unit that stores, typically in an electronic memory device, the history of use of the core units 2A and 2B. Alternatively, if one core unit is in no condition to be operated, for instance because it requires servicing, the control unit may be arranged to active the other core unit.

FIG. 3c shows another toggle switch that has a selection lever 91 movable along a selection path 92 into various positions to: switch off the system as indicated by selection position 93; switch on the left-hand unit 2A as indicated by selection position 96; switch on the right-hand unit 2B as indicated by selection position 97; and switch on both units 2A,2B as indicated by selection position 98.

The machine may also be provided with an automatic shut-off mode, such as a timer-based mode. In this case, the power-switch may be automatically returned into its "OFF" selection position 93 when the automatic shut-off mode runs an automatic shut-down process on the machine.

In a variation, it is also possible to provide a different multi-position switch such as a rotatable knob or wheel or cursor with a selection scale.

In FIGS. 1 to 3a, power switch 9 is shown on base platform 1,3,4. However, it is also possible to locate such power switches elsewhere, in particular on a core unit.

In a further variation, it is also possible to provide only two operative modes, e.g. via a two-position button, namely: all core units 2A,2B switch on or all core units 2A,2B switched off.

Furthermore, a common water tank 7 is provided. Thus the shown base platform 4 does not only accommodate a plurality of core units 1, but has the fluid management functionality of having means for distributing water from a common water tank 7 to a plurality of core units.

Note that different fluid management functions can be achieved via hardware and/or software.

As has been shown with reference to FIGS. 1 to 3a, different platforms are provided which distinguish from each other by their respective fluid management equipment. The core units according to the invention, however, do all have common fluid management equipment. This leads to a modular manufacturing of beverage production machines which will now be explained in the following.

Figure 4:
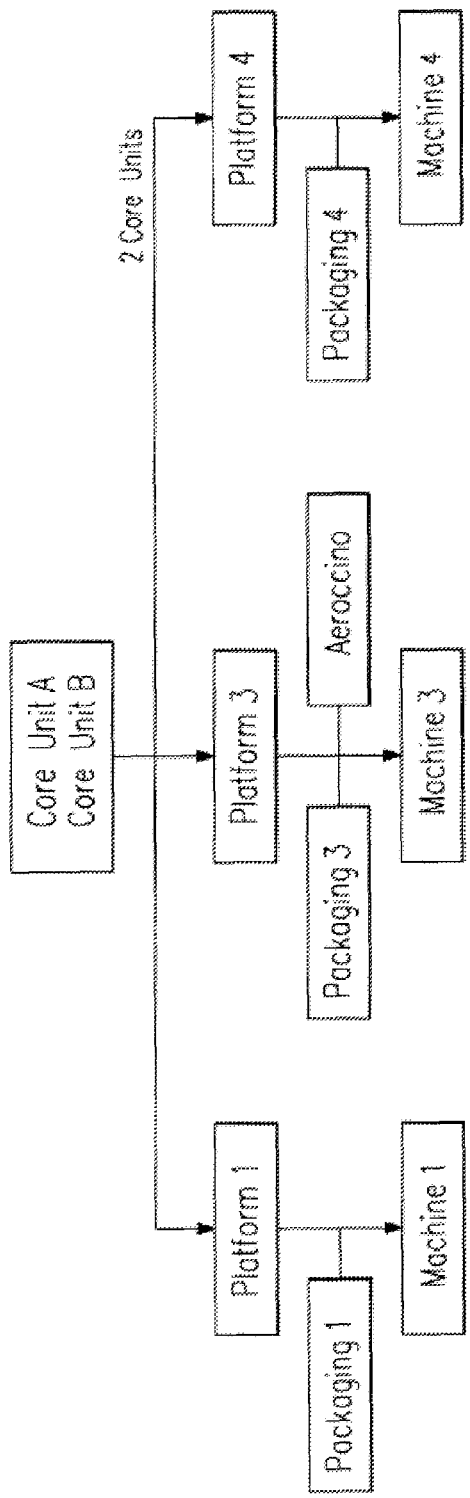
FIG. 4 shows a flow chart of the modular manufacturing method of the invention.

FIG. 4 shows a flow chart representing the modular concept of the invention. A common core unit A or B can be connected respectively to different platforms 1, 3 or 4 to produce specific machines 1, 3 or 4. It can be noted that a limited number of core units can be selected that fits a higher number of base platforms offering different functions. Therefore, a base machine 1 can be easily upgraded (preferably at the manufacturing site and not by the consumer) by exchanging the platform 1 by a second platform 3 which has different fluid management functions than platform 1. Also, the platform 4 may receive two core unit A, B or A and B, thus offering a larger choice of machines.

The difference in core units A and B may comprise slight variations. However, the core units A and B should be essentially of the same size for fitting in each of the platforms 1, 3 or 4.

Figure 5:
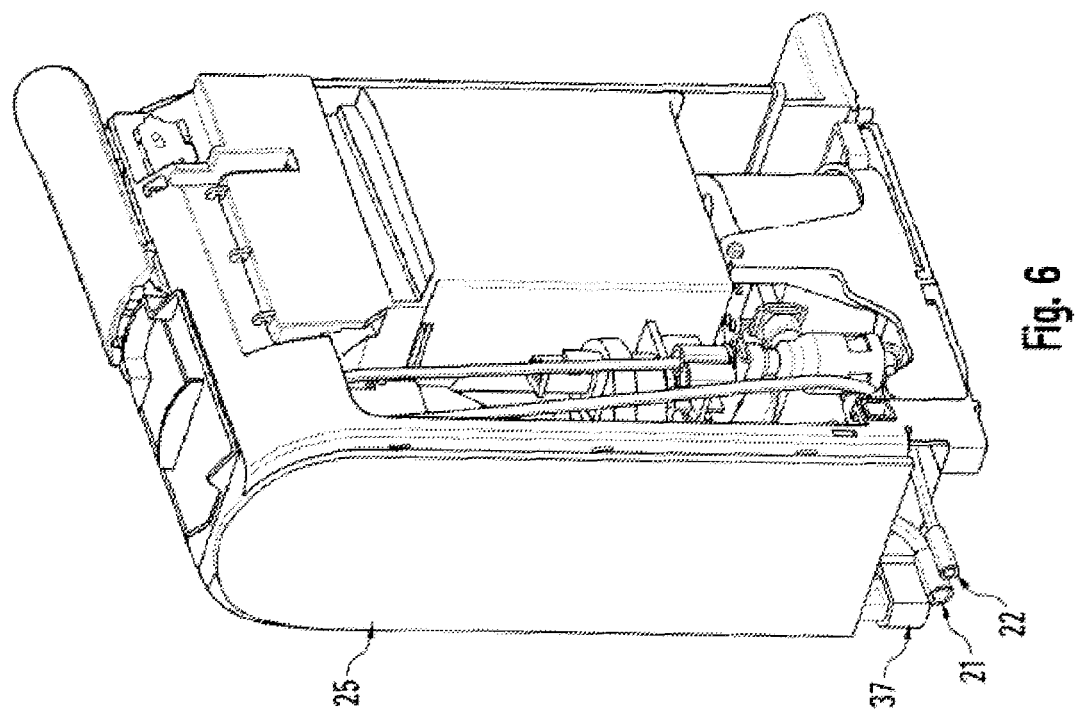
FIG. 5 shows the interior of a core unit according to the invention.
Figure 13:
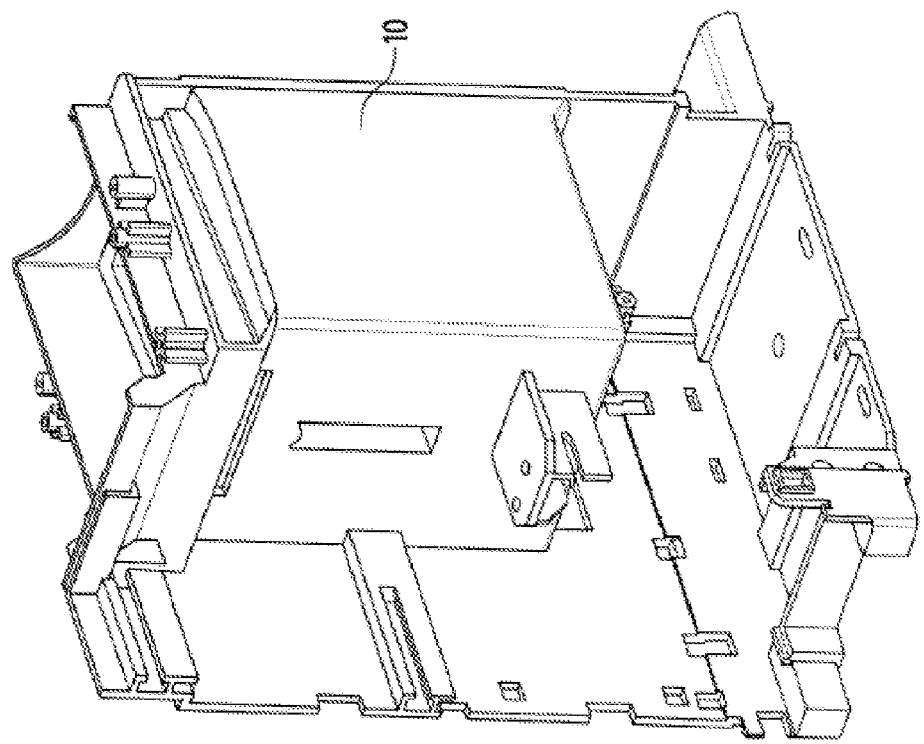
FIG. 13 shows a frame (chassis) of a core unit according to the present invention.

In FIG. 5 is illustrated an inside view of a core unit of the system. It comprises a frame 10. See FIG. 13 for the frame 10 alone. On the frame is assembled a brewing module 11. The brewing module comprises means for holding a substance containing capsule, e.g., a coffee capsule, and beverage delivery means such as a beverage duct.

The holding means typically comprises a capsule holder and brewing cage, a fluid injection system for injecting water in the capsule and a closure device such as a lever and a knee joint mechanism. Suitable extraction modules are described in EP 1 859 713. Since the system is modular, other brewing units of different designs could be associated to the frame for upgrading mechanical functions or receiving other capsule formats or types (e.g., filter pods).

A water heater such as a thermo-block 12 or similar thermal bloc inertia-type heaters is provided in the frame and connected to it. The water heater is associated to the brewing module via a priming valve 13 and soft tubular lines 14, 15. For ease of connection, clipping means may be used to connect the tubular lines to the different elements.

A pressure pump 17 is provided to supply water to the water heater at a high pressure. Therefore, the pressure pump is associated to the water heater by means of a soft tubular line 16. The pump can be a piston pump. A flow meter 18 is also provided upstream the pump to count the volume of water sucked by the pump and distributed to the water heater and therefore to enable a precise beverage volume management. Water line 19 represents the cold water entering the water connection entry 21 and leading to the flow meter 18. Water line 20 represents the cold water line exiting the water connection exit 22 coming from the priming valve 13. This line 20 is to balance the pressure in the fluid circuit by purging air and/or water during the priming operation of the system. The valve is described in more detail in EP 1 798 457.

An electronic circuitry 23 is also disposed in the frame to control the different elements of the core unit, in particular, the water heater, the pump and the flow meter.

One or two button prints 24 are also placed on the side of the module which are electronically connected to the electronic circuitry 23. These are known per se and typically soft pads enabling to open/close the electronic circuit for running the pump. Each print 24 may serve for a programmed volume of water to be pumped corresponding to a beverage size, e.g., a short espresso coffee of 40 mL or a long coffee cup of 110 mL.

Figure 10:
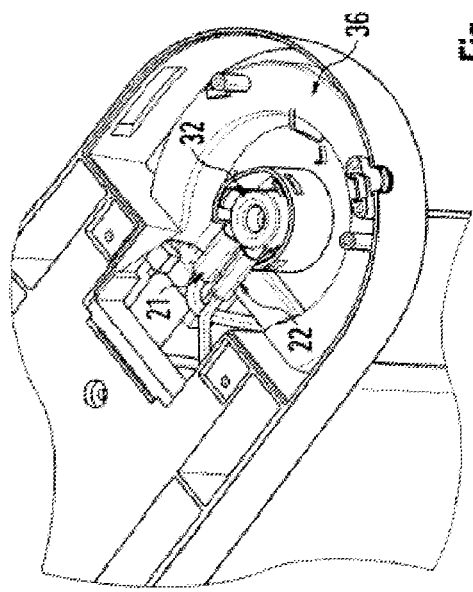
FIG. 10 shows a detail of FIG. 9 in order to illustrate a water (fluid) connector.
Figure 10B:
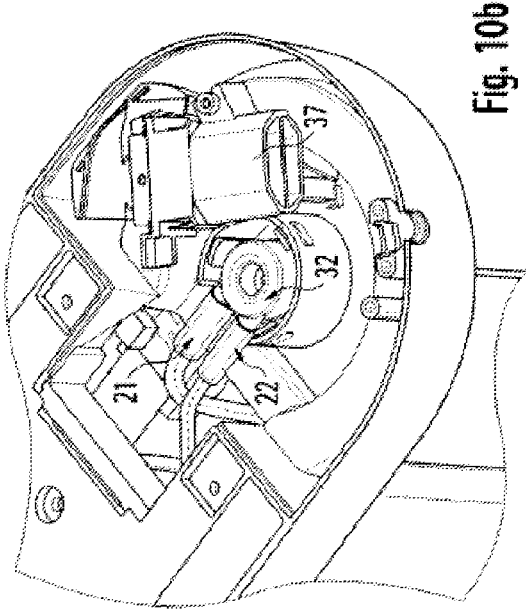
FIG. 10b shows the electrical connection of the core unit with the base platform.

In FIG. 10b one can see, at the rear of the core unit, a possible embodiment of an electrical connector 37 and the water connectors 21, 22 representing the essential connections to be connected to matching connecting means of the selected base platform.

The different elements are typically connected to the frame by screws, rivets or equivalent connecting means.

Figure 6:
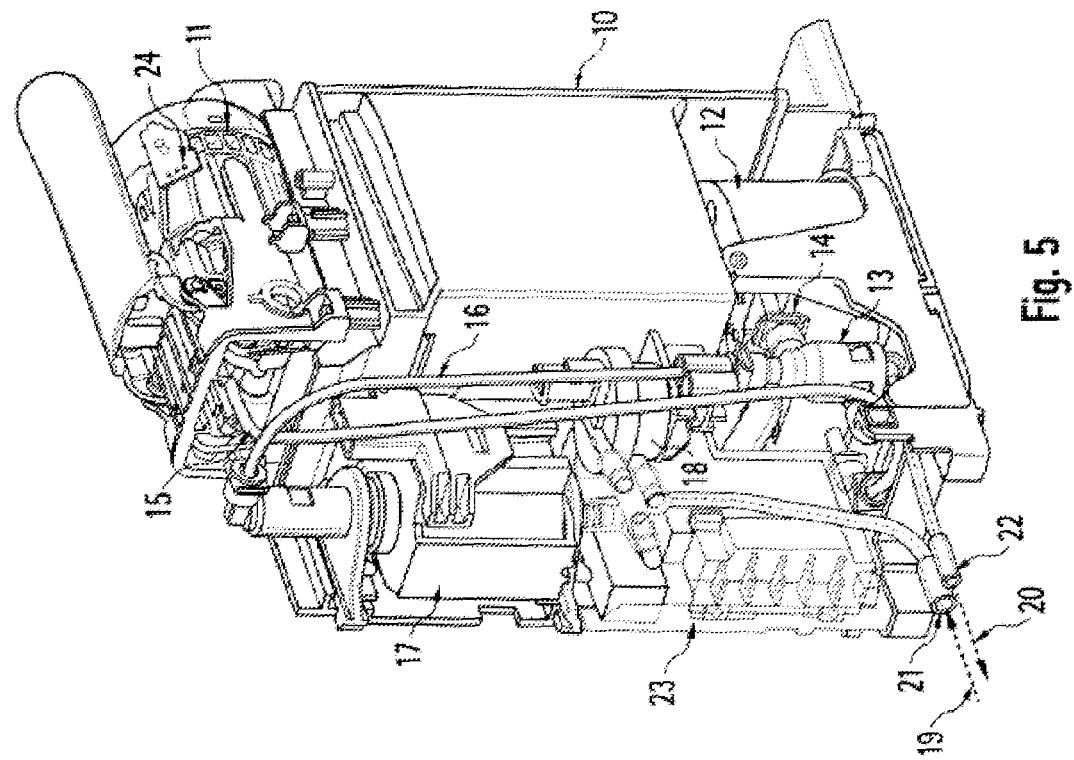
FIG. 6 shows the rear side of a core unit according to the present invention.
Figure 7:
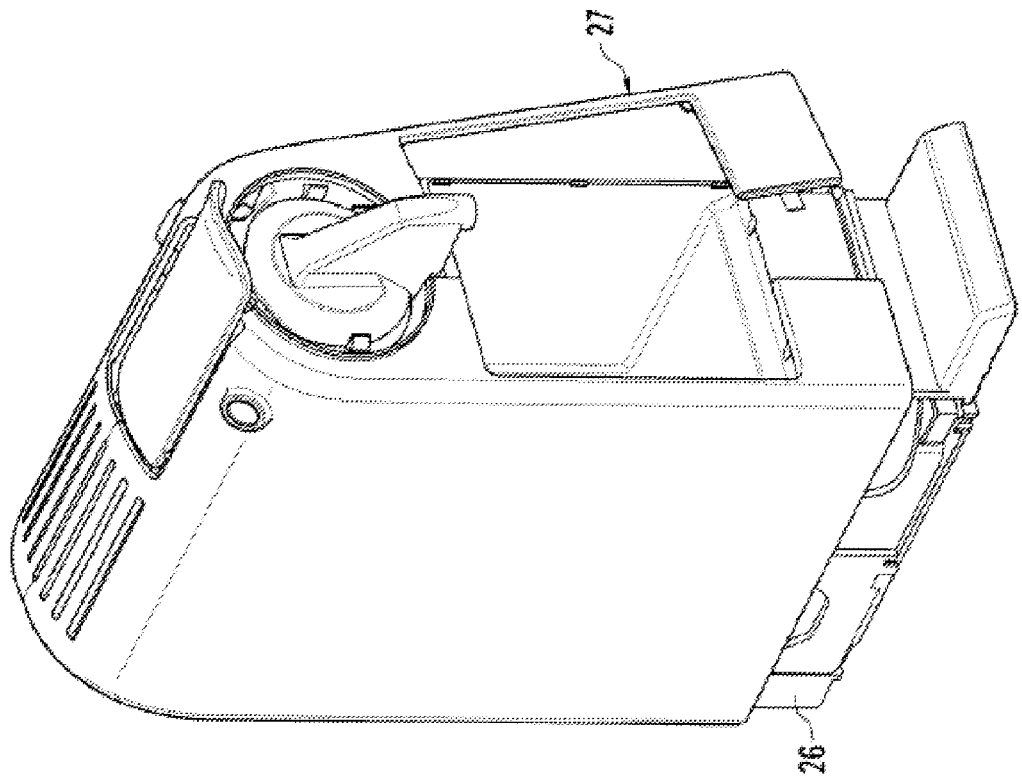
FIG. 7 shows side panels of a core unit.

As illustrated in FIG. 6, a cover 25 is connected to the frame to at least partially mask the components of the frame. Then on FIG. 7, two side panels 26, 27 are hooked and fixed to the cover on each side of the core unit to finalize the masking of the components.

Figure 8:
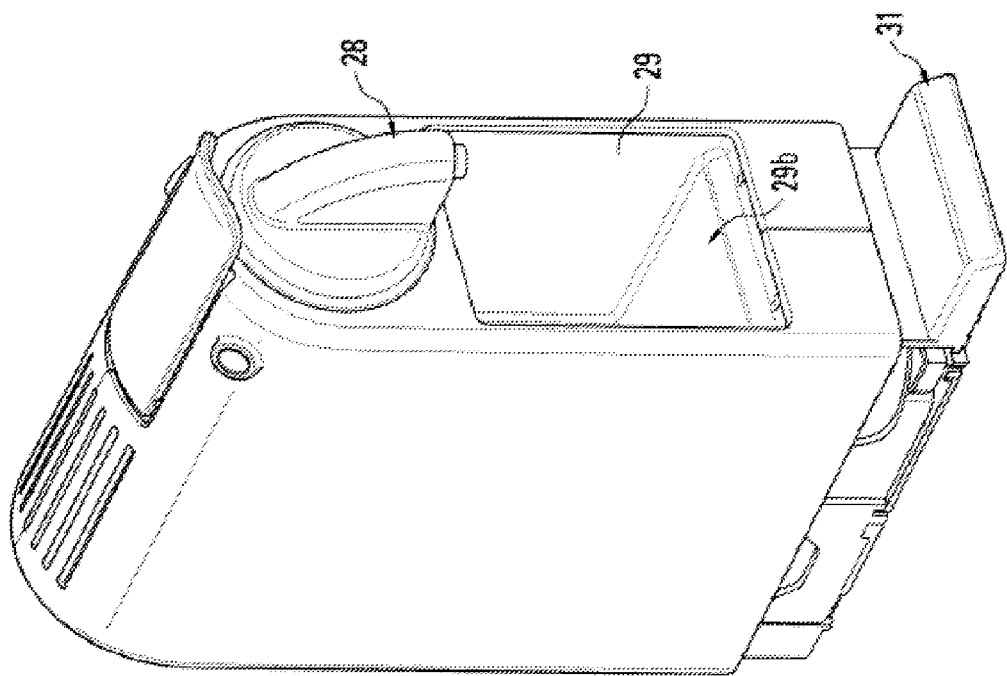
FIG. 8 shows a core unit in a state ready for being mounted on a base platform.

FIG. 8 represents the core unit 1 as available for being associated to different base platforms. A front beverage delivery cover 28 can be snap fitted to the side panels for masking the front of the brewing unit.

At the front of core unit is provided in the frame a cavity 29 for lodging a capsule collecting basket 29a which can freely slide in the cavity. The basket is placed below the brewing module for collecting the waste capsules that fall by gravity after brewing and opening of the module by the lever. A recipient 29b under the basket 29a is provided to separate waste water from the waste capsules. Thus, the cleaning and the handling of the core unit are enhanced.

Figure 9:
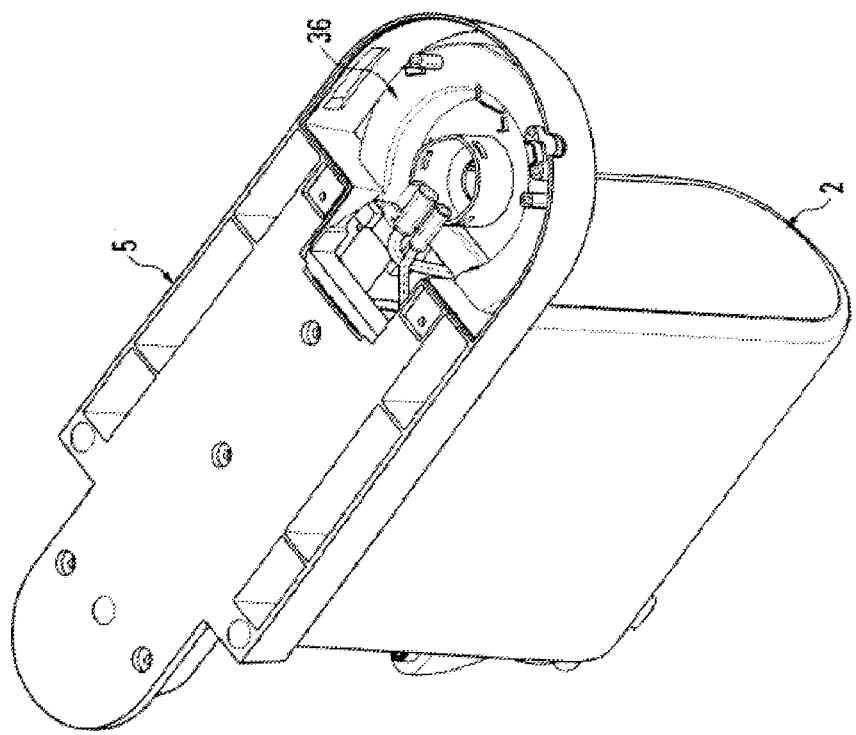
FIG. 9 shows the base plate of a core unit, which base plate is the interfacing surface to a base platform.

In FIG. 9, a base platform 5 (seen upside down in this Figure) is selected and associated to the core unit 2 of FIG. 8. The base platform comprises a base support made of injected plastic. FIG. 12 shows the upper side of the base platform with a central seat 50 forming a hollow recess sufficient to receive the core unit. As illustrated in FIG. 8, the core unit 1 can comprise a lower front engaging portion 31 that can fit in a front connecting recess of the base platform (not shown) to ensure a better connection.

The final secured connection can be done by screwing of the base platform to the core unit as shown in FIG. 11.

FIGS. 9 and 10 show a recess 36 at the rear and bottom end of the base platform for connecting the water connectors 21, 22 of the core unit to the water connector 32 of the base platform in the water tank connecting zone. In FIG. 12, one can see the water tank 7 which is removably mounted on the connecting zone of the base platform. A recessed and/or protruding structure 33 can be provided for a better fitting of the tank on the platform.

On FIG. 10B, one can also see the recess 36 of the platform being equipped with the electrical connection 37 of the core unit 2 for connecting it to the base platform. The connection can be made by flying cables as known per se.

Figure 14:
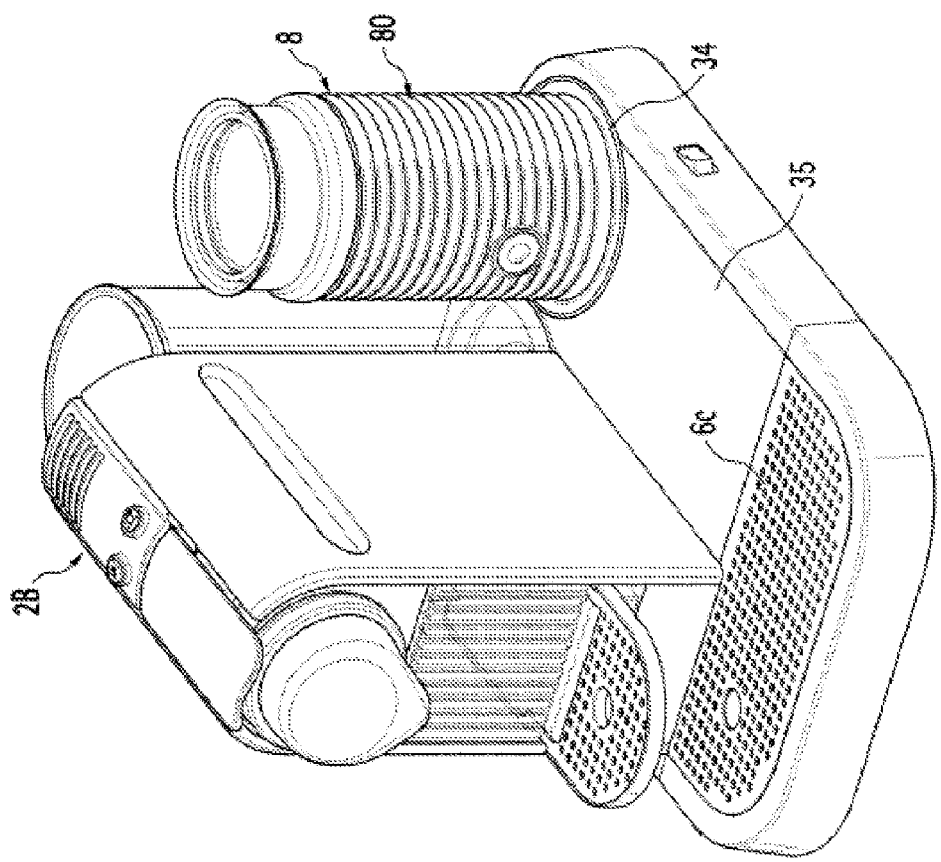
FIG. 14 shows a modified core unit according to the present invention.

FIG. 14 shows another system with a similar core unit 2B and a different base platform 6C. The core unit 2B is technically identical to the core unit described in relation to the previous Figures but may have aesthetic variants such as a different finish surface, e.g., a metallised or chrome-plated surfaces.

The base platform 6C has new fluid management functions compared to the base platform of FIG. 12. It may have a cordless milk frothing assembly 8. Therefore, the base platform comprises a dedicated area 34 forming support with a cordless electrical connection able to receive in a removable manner a milk frothing jug 80. The milk jug has mechanical whipping elements for whipping liquid milk. A description of a cordless milk frothing assembly itself is described in detail in WO 2006/050900.

The base platform may also comprise a cup support area 35. This support area can comprise heating elements, e.g., a resistive heating surface for maintaining the cups at a warm temperature. The heating elements can be switched on as soon as the platform is supplied in current of the main.

It can be noted that the base platforms provide the water and electrical supplies to the core unit. Peripheral functions can be provided such as milk frothing function, cup heating function, a hot water delivery (e.g., by a heating water kettle) additional brewing capacity, etc. The base platform does not need to receive an electronic circuitry although such circuitry is not to be excluded if complex functions would require a specific control, e.g., independent from the control of the core unit. In case, the platform would require a control circuitry, the core unit can work as a master unit and the base platform as a slave unit or vice versa.

In any case, if two or more core units are provided each having control circuitry, a protocol for coordinating the control is provided. E.g. the protocol can coordinate the control such that one of the core units has a higher priority control than the respectively other one.

As illustrated in FIGS. 3 and 3a, more than one core unit can be connected to a selected platform adapted for this purpose. Each control circuitry of the units can work independently or in a master/slave relationship to ensure a proper energy management control. In particular, compliance with particular flickering norms (e.g., EN61000-3-3) requires the coordination of the empowering of the water heaters and eventually enforcement of current breaks in the extraction frequencies or limitation of simultaneous or overlapping extraction cycles.

Figure 15:
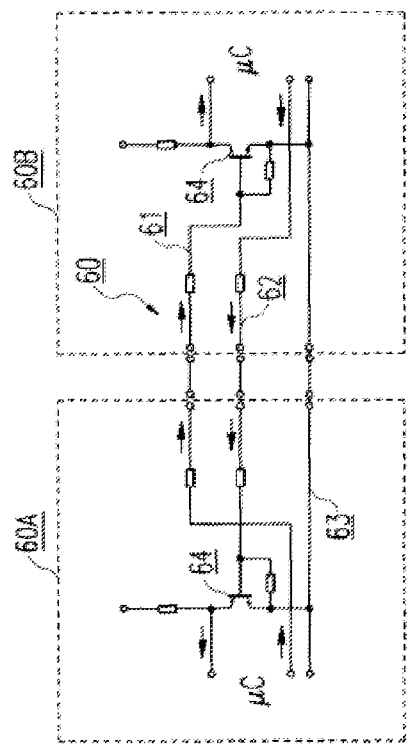
FIG. 15 is a schematic drawing of the electronic circuit of a level shifter that connects two control circuitries according to the present invention.

FIG. 15 is a schematic drawing of the electronic circuit of a level shifter 60 that connects two control circuitries illustrated in doted lines 60A and 60B, each having a micro controller associated with the level shifter 60. The level shifter 60 comprises two transmission lines 61,62 and a neutral line 63 to equalise the electric potentials of the control circuitries 60A,60B. Each line 61,62 connects the control circuitries through a transistor 64.

Such a level shifter 60 permits a fast bidirectional communication between control circuitries 60A and 60B at a low price.

What is claimed is:

1. A set of at least two different beverage production machines with each beverage production machine comprising a core unit provided with control circuitry, and a plurality of different base platforms that differ as to beverage production functions relating to the chemical, physical or mechanical processing of the liquid fed to the interior of the ingredient batch of the beverage production machine, with the set including at least one or more of (1) a first machine having a first base platform that includes means to process a first liquid comprising water and being in fluid and electric connection with the core unit of a first beverage production machine; (2) a second machine having a second base platform that includes means to process a second liquid comprising water and being in fluid and electric connection with the core units of two beverage production machines; and (3) a third machine having a third platform and a core unit in fluid and electric connection with the platform and including a milk frother to froth a third liquid comprising milk, wherein each beverage production module includes means for housing an ingredient batch and means for feeding a liquid comprising water to the interior of the ingredient batch, with at least one core unit being fixedly mounted on one of the different base platforms, wherein the first, second and third platforms differ between them in view of the dedicated respective combination with the core(s) and milk frother in order to provide different beverage production functions relating to the chemical, physical or mechanical processing of the liquid fed to the interior of the ingredient batch.

2. The set according to claim 1, wherein the first and second liquids are water and each base platform is provided with a seat for receiving a core unit and a connection for receiving a water tank and the electrical supply means, wherein the ingredient batches are contained in capsules or pods.

3. The set according to claim 2, wherein the base platforms are provided with water guiding means for supplying water from the water tank through the first base platform to a connected core unit.

4. The set according to claim 1, wherein at least one base platform is designed to accommodate at least two core units and to supply them with water from a common water tank.

5. The set according to claim 1, wherein at least two of the core units have a common user power switch.

6. The set according to claim 5, wherein the power switch comprises a toggle-switch, a rotatable wheel or a knob switch, and has two selection positions for switching on and off at least two of the core units simultaneously.

7. The set according to claim 5, wherein the power switch has one or more selection positions for switching on the two core units, with any additional core unit(s) that are present remaining switched off.

8. The set according to claim 7, further comprising a control unit, wherein the selection position(s) for switching on the units is/are permanently associated with one or more of the two core units and designate(s) those core units to be switched on simultaneously, with the control unit being arranged to select which core unit(s) to switch on based on an individual history of use of the core units.

9. The set according to claim 5, wherein each core unit is provided with control circuitry, and the two core units have their control circuitries inter-connected via communication means for exchanging data.

10. The set according to claim 9, wherein one base platform provides the core unit with electrical power and water from a water tank mounted on the base platform, wherein the core unit but not the base platform is provided with a user control interface.

11. The set according to claim 10, wherein one base platform is provided with a seat for receiving the core unit and a connection for receiving the water tank and electrical supply means, with that base platform also provided with water guiding means for supplying water from the water tank to the connected core unit; and wherein the core unit and that base platform are designed such that an electrical connection and a fluid connection between the core unit and that base platform is produced in one step.

12. The set according to claim 9, wherein the communication means is arranged to allow a bidirectional communication between two inter-connected control circuitries and comprises a level shifter.

13. The set according to claim 9, wherein the communication means between a pair of inter-connected control circuitries comprises two transmission cables; a neutral cable extending between the pair of inter-connected control circuitries; and a pair of transistors.

14. The set according to claim 9, wherein one of the connected control circuitries has a master status, and the remaining inter-connected control circuitry(ies) has a slave status, with each inter-connected control circuitry arranged to periodically communicate its current master or slave status to the remaining control circuitry(ies) using a master/slave signal.

15. The set according to claim 14, wherein each inter-connected control circuitry is configured to change its status from slave to master and vice versa, whenever needed, and further wherein each inter-connected control circuitry is configured to be in a slave status as a default status, a master determination process being used to change the status of one of the inter-connected control circuitry to a master status when none of the inter-connected control circuitry has a master status.

16. The set according to claim 14, wherein the inter-connected control circuitries are arranged to communicate between themselves using a synchronisation signal for allocating between the core units one or more shared supply sources of material or power having a limited availability or limited accessibility, so as to provide a synchronised allocation of the supply source(s) between the core units over time.

17. The set according to claim 16, wherein a control circuitry having a master status is arranged to allocate the limited supply sources of material or power as needed for its core unit, one or more control circuitry(ies) having a slave status being arranged to allocate to their respective core unit, a residual allocation capacity of the limited supply sources.

18. The set according to claim 16, wherein the control circuitries of the core units are arranged to send master/slave signals to each other, which signals are superimposed with the synchronisation signal on a same communication channel but separated through time windows.

19. The set according to claim 16, wherein each core unit comprises a thermo-block for heating the liquid prior to feeding to the ingredient batches, the inter-connected control circuitries being arranged to synchronise access by the core units of a common power source with overall limited accessibility per time unit and/or a limited availability, to optimize heating in the thermo-blocks within such overall access and/or power limit.

20. The set of claim 19, wherein the inter-connected control circuitry of each core unit is arranged to send a synchronisation signal to the other inter-connected control circuitries for each individual access to the power source with limited accessibility per time unit, so that the overall access limit of the power source per time unit is not exceeded by the total accesses by the different core units during the corresponding time unit.

21. The set of claim 20, wherein the inter-connected control circuitries are so arranged that all the core units enter a pause mode when the overall access limit during a time unit is reached or close to be reached, no liquid heated by the thermo-blocks being fed to an ingredient batch during the pause mode until the corresponding time unit has ended and a new a time unit has started.

22. The set according to claim 21, wherein the inter-connected control circuitries are arranged to count during a time unit all accesses to the power source for heating batches of the liquid passed through the thermo-blocks and then fed to the ingredient batch, and being so arranged as to enter a pause mode when during said time unit the heating by a thermo-block of a further batch of liquid would necessitate a number of accesses to the power source that would lead to exceeding the overall access limit.

23. The set of claim 1, which includes the first and second machines and platforms.

24. The set of claim 1, which includes the first and third machines and platforms.

25. The set of claim 1, which includes the second and third machines and platforms.

* * * * *